United States Patent Office 2,950,300
Patented Aug. 23, 1960

2,950,300
LOW TEMPERATURE METHOD FOR PRODUCING CHLOROFLUORO ACID HALIDES

David B. Brandon, Orange, N.J., assignor, by mesne assignments, to Minnesota Mining and Manufacturing Company, St. Paul, Minn., a corporation of Delaware No Drawing. Filed Aug. 27, 1954, Ser. No. 452,704

11 Claims. (Cl. 260—408)

This invention relates to new methods of preparation of polyfluorocarboxylic compounds and polyfluorohalogenated carboxylic compounds. More particularly, it relates to new methods for preparing perfluorocarboxylic acids and fluoroperchlorinated carboxylic acids and their salts.

It has been disclosed that polyfluoro alkanoic acids and polyfluoro polychloro alkanoic acids may be prepared by heating a completely halogenated ethylene with methanol in the presence of a free radical producing catalyst to produce polyfluoro alkanols of the formula $$H(CF_2CF_2)_nCH_2OH,$$

or the corresponding polyfluoropolychloro alkanols, and thereafter oxidizing the alkanols to alkanoic acids. The polyfluoro alkanoic acids and polyfluoropolychloro alkanoic acids thus produced are useful compounds in that they have good stability and inertness and in that they are compatible with fluorocarbon polymers and fluorochlorocarbon polymers. However, such polyhalo alkanoic acids are not as stable as they would be without the hydrogen atom on the carbon furthest removed from the carboxylic group since the hydrogen atom may lead to the elimination of hydrogen halide and also result in the corrosion of metal parts in contact with them. This elimination may lead to further breakdown of the halo acid due to the reactivity of the carbon-carbon double bond produced. It is also to be noted that the polyhalo alkanoic acids prepared in this manner can only be those having an odd number of carbon atoms and, when they contain chlorine in the monomer, can only be those wherein the ratio of chlorine atoms to total halogen atoms in the polymer must be in mutiples of 25 percent.

It is also known that perfluoro alkanoic acids having the general formula $F(CF_2)_nCOOH$ may be prepared by the electro-chemical fluorination of alkanoic acids in anhydrous hydrogen fluoride with subsequent hydrolysis of the resulting fluorinated acid fluorides. Such acids, being completely halogenated, are quite stable and may be prepared in chain lengths of either an odd or an even number of carbon atoms. However, this method has not been shown to be applicable to the preparation of long chain perhaloalkanoic acids containing halogen atoms other than fluorine. The presence of other halogen atoms is often desirable to impart increased compatibility with polymers containing halogen atoms other than fluorine. Furthermore, the yield of long chain acids is likely to be lowered due to increased scission in the fluorination of long chain acids.

It has recently been found that a new class of fluoroperhalogenated carboxylic compounds could be prepared by subjecting a perhalogenated aliphatic olefin having at least 7 carbon atoms to drastic oxidation conditions. It has also been found that perfluorocarboxylic compounds, including the perfluoroalkanoic acids described above, could be prepared by subjecting perfluorinated olefins to drastic oxidation conditions.

Among the methods for the oxidation of perfluoro olefins and fluoroperhalogenated olefins is the method which comprises subjecting these olefins to oxidation in the presence of permanganate solutions, at temperatures ranging from about room temperature to about 100° C. The yields of the desired products obtained by oxidation in this manner have been low.

It is an object of this invention to provide an improved method for the production of fluorine-containing polyhalogenated aliphatic carboxylic acids and their esters and salts.

It is a further object of this invention to provide an improved method for preparing fluoroperhalogenated aliphatic carboxylic acids and acid halides, and perfluorinated aliphatic carboxylic acids and acid halides, in any desired carbon chain length.

It is a further object of this invention to provide an improved method for preparing fluoroperhalogenated carboxylic acids and their salts in any desired proportion of fluorine to other halogens.

It is a further object of this invention to provide an improved method for the production of perfluorinated acids and fluoroperchlorinated acids and their salts in high yield.

It is a further object of this invention to provide a method for the production of fluoroperchlorinated acids and acid halides, and perfluorinated acids and acid halides, which results in the minimum formation of by-products.

It is a further object of this invention to provide a method for the production of fluoroperchlorinated acids and perfluorinated acids and their salts which allows for relatively easy isolation of the product.

It is a further object of this invention to provide an improved method for the preparation of perhalogenated aliphatic carboxylic acids and salts which have marked surface active properties.

Still another object of this invention is to provide a new method for the production of fluoroperhalogenated aliphatic carboxylic acid salts which may be used as gelling agents in grease compositions containing chlorotrifluoroethylene polymers.

Other objects will appear hereinafter.

These and other objects and advantages are obtained by subjecting a polyhalogenated aliphatic olefin having at least 7 carbon atoms and being at least half fluorinated to oxidation with a permanganate solution at a temperature below about 10° C. It is preferable that the oxidation take place in a substantially non-aqueous medium, particularly at temperatures below 0° C. When the oxidation takes place under completely anhydrous conditions, acid halides rather than carboxylic compounds are produced, but these halides are easily converted to carboxylic acids by hydrolysis.

Although the method of this invention is applicable to any polyhalogenated aliphatic olefin starting material, it is preferred to start with a material which is at least half fluorinated. For producing products of greatest chemical stability, the olefins are preferably perhalogenated, since, as stated above, the presence of hydrogen may lead to the elimination of hydrogen halide from the acid and then further breakdown by reason of the double bonds produced.

The polyhalogenated olefins which are oxidized in accordance with this invention may contain a single olefinic bond or may contain several. They may be prepared in several ways, as, for example:

(1) By thermal cracking of high molecular weight homopolymers or copolymers of polyfluoro and polyfluorochloro olefins, and particularly perfluoro and perfluorochloro olefins.

(2) By the polymerization of halogenated dienes, or preferably by the copolymerization of perhalogenated dienes with perhalogenated mono-olefins.

(3) By the dehydrohalogenation of a polyhalogenated polymer which contains a limited number of hydrogen atoms.

(4) By the partial dehalogenation of a perfluorochloro polymer to produce a limited number of double bonds.

The thermal cracking of polyhalogenated, and particularly perhalogenated polymers, to produce low molecular weight materials in the oil and wax range, is well known. For example, the polymer of chlorotrifluoroethylene may be cracked at temperatures between about 330° and about 400° C. at cracking times ranging from about 10 seconds to about 2 hours. The cracking may take place discontinuously, as for example, in an autoclave, or continuously in a cracking coil. A more detailed description of cracking conditions may be found in the United States patent to William T. Miller, No. 2,636,907, issued April 28, 1953.

Each cleavage of a polymer chain during cracking produces one double bond. Since cracking to the oil and wax range ordinarily involves successive cleavages of the polymer chain, most of the fragments of such cracking are unsaturated. Ordinarily, the unsaturation is at a terminal bond, and thus the unsaturated products of thermal cracking are usually either mono-olefins or di-olefins.

The polymerization of polyhalogenated, and particularly perhalogenated dienes, is also known. Perfluorobutadiene has been homopolymerized to high polymers under very high pressures, of the order of about 100,000 atmospheres, with oxygen or peroxide promotion at temperatures ranging from about 60 to 70° C. Relatively low polymers of perfluorobutadiene have been prepared by polymerization with benzoyl peroxide and with the addition of solvents such as chloroform. Copolymerization of perfluorobutadiene with perhalogenated ethylenes under similar conditions is also possible, although the yields are small. Polymers prepared by the copolymerization of dienes with mono-olefins may contain olefinic bonds at any position in the chain and saturated chain segments of any desired length, depending on the relative proportions of the comonomers.

Polymers containing a small number of hydrogen atoms, as, for example, copolymers including small amounts of difluorochloroethylene or trifluoroethylene, may be dehydrohalogenated to produce polymers having olefinic bonds at any portion of the chain. The dehydrohalogenation may be by heat alone or may be in the presence of a basic reagent. It is preferable that all of the hydrogen be removed by the dehydrohalogenation reaction in order to obtain highly stable acids. However, the process of this invention is applicable to polyhalogenated olefins containing a substantial number of hydrogen atoms.

For the thermal elimination of HX from copolymers containing a relatively small number of hydrogen atoms, it will be said that no appreciable dehydrohalogenation will occur at temperatures below about 350° C. and that above about 700° C. extensive degradation of the polymer will occur. The preferable temperature range would, therefore, be from about 450° C. to 650° C., the higher temperatures being employed for the elimination of HF or HCl from the more highly fluorinated copolymers.

The dehydrohalogenation is preferably carried out continuously by passing the hydrogen-containing polymer through a tube heated to the effective temperature. The tube should be composed of or lined with a material which is inert to the reaction and the reaction products. Carbon, nickel, and the Monel metals are sufficiently inert for the purpose.

Some copolymers can eliminate HX spontaneously on mere heating in the liquid phase. In such a case the compound may be dropped through or on to a tube heated to the effective dehydrohalogenation temperature.

The time of exposure of the reactants to dehydrohalogenation conditions is a matter of considerable importance. In general, it is preferable to use as short a contact time as possible to avoid excessive pyrolytic degradation. It is preferable to pass the vapors through at a velocity such that they are in the hot zone of the reactor from about 0.5 second to 10 seconds. The time of exposure to the elevated temperature employed may be controlled by conducting the dehydrohalogenation in the vapor phase. The rate of flow of vapors through the hot tube may be controlled by the rate of heating of the copolymer. The copolymers which are stable at their boiling points may be heated to vaporization in a vessel, and the vapors passed through the tube which is electrically heated to the effective temperature. The dehydrohalogenated product is collected in a cooled receiver and may be washed with water or dilute alkali solution to remove the hydrogen halide. The product may be further purified by distillation. In the event that the copolymer is one which decomposes below the boiling point, then the dehydrohalogenation may be conducted at subatmospheric pressures, treating the vapors as described above.

If desired, the dehydrohalogenation of copolymers containing a small number of hydrogen atoms may take place in the presence of a basic reagent, such as an alkali metal hydroxide or an alkaline earth metal hydroxide. Dehydrohalogenation in the presence of an alkaline reagent will occur at temperatures in the range of 50° C. to 325° C., preferably from 100 to 300° C. The lower temperatures are preferably employed when a chlorine atom is on a carbon adjacent to a hydrogen bearing carbon. The higher temperatures are employed when the only halogen atoms on the carbons adjacent to the hydrogen are fluorine.

The alkali may be added to the polymer as a 20–70% water solution, or suspension as in the case of calcium hydroxide, or it may be suspended in an alcohol such as methanol. The alkaline mixture is added to the polymer and the mixture refluxed with vigorous stirring for a period of from 1 to 24 hours, although a somewhat longer reaction time can be used without significantly decreasing the yield of product. The aqueous portion is removed by decantation, followed by exhaustive washing of the residual oil with water. If a temperature above 100° C. is required, as may be the case with the more highly fluorinated compounds, then molten caustic is added to the heated polymer with stirring. The melting point of the basic reagent may be lowered by admixing with another, and the molten mixture added to the polymer.

The polymer may be dissolved or suspended in a high boiling organic liquid in order to facilitate stirring and contact with the caustic. These organic liquids may be of the aromatic type such as the alkylated benzenes illustrated by toluene, 1,3,5-trimethylbenzene; aromatic distillates, such as Solvesso 100 and 150, etc.; and polyhalogenated hydrocarbon solvents. After removal of any solvent the metal halide may be removed from the product by washing with water, or the product may be separated from the salts by distillation, including steam distillation.

The alkaline reagent must be present in at least stoichiometric amounts, although as much as a 10 to 35% or more excess may be employed.

The partial dehalogenation of a perfluorohalo polymer may be accomplished by reacting the perfluorohalo polymer with a reactive metal such as powdered zinc, preferably with the polymer in solution in an organic solvent. Chlorine, bromine or iodine substituents may be removed by the reactive metal, the iodine being the most easily removed. The temperature of the dehalogenation reaction may vary from room temperature to just below the boiling point of the organic solvent at the operating pressure.

Oxidation of the long chain polyfluorohalo olefins, produced as above described, or produced in any other manner, results in the cleavage of the aliphatic chain at the double bond and in the production of a carboxylic acid, a carboxylic acid salt or an acid chloride, depending on the method of oxidation or oxidation medium used. When a perfluorohalo olefin is oxidized at a single terminal double bond, the resulting mono-carboxylic acid has a carbon chain length less than that of the olefin by one. When an olefin containing a double bond at each end is oxidized, it forms a dibasic acid having a chain length shorter by 2. When a double bond at a midpoint in the olefin is oxidized, the chain is ruptured at that point.

Oxidation of polyfluoro olefins and fluoropolyhalo olefins to produce carboxylic compounds requires a vigorous oxidizing agent. This invention relates to oxidation with permanganate salts. Any salt of permanganic acid may be used. Typical examples are the alkali and alkaline earth metal permanganates such as sodium, potassium, lithium, calcium, or barium permanganate. Potassium permanganate is preferred because of its availability and cheapness.

The oxidation takes place in a liquid medium at a temperature below 10° C. The permanganate salt may be in solution or suspension in the liquid medium, with solutions preferred. The liquid medium may consist of a single liquid phase or of two immiscible liquid phases. The liquid medium may be completely aqueous, partially aqueous or completely anhydrous, tending toward the latter state when extremely low temperatures are used. When employing temperatures between about −100° C. and 0° C. it is necessary to use a solvent which does not freeze at the temperature employed and which is inert, or substantially inert, to permanganate oxidation under the reaction conditions and to reaction with the starting material and reaction products. Typical examples of suitable solvents are ethers, such as diethyl ether (F.P. −116° C.), propyl ether (−122° C.), diisopropyl ether (−60° C.), halogenated solvents, such as carbon tetrachloride (−22.6° C.), chloroform (−63.5°), 1,1,2-trichloro 1,2,2,-trifluoroethane (−35° C.); esters, such as methyl acetate (−98.7° C.); ketones, such as acetone (−94.6° C.) and methyl ethyl ketone (−85.9° C.); and pyridine (−42° C.). The ketones and pyridine are particularly good solvents, since they dissolve both the permanganate and the olefin. Alcohols, such as methanol (−97.8° C.), ethanol (−112° C.), etc., may also be used as solvents, but in this case the acid halide produced is at least partially converted to the corresponding ester.

The temperature of the oxidation reaction may be as high as 10° C. and may be as low as the freezing point of the liquid medium will permit. Temperatures as low as −100° C. and lower may be used if the liquid medium does not freeze. It has been found that temperatures in excess of 10° C. produce relatively small amounts of the desired perfluoro or perfluorohalo acid and produce relatively large amounts of low molecular weight products such as carbon dioxide.

While it is not desired to be bound by any particular theory of operation, it is believed that oxidation of polyhalo-olefins at ambient temperatures produces initially the desired carboxylic acid or acid halide, just as in the improved process claimed herein. It is believed that at ambient temperatures or above, the halogen atoms bound to a carbon atom next to the carboxylic group are particularly susceptible to replacement by an oxygen atom from the permanganate, ultimately producing a keto acid. The keto acid is unstable and eliminates carbon dioxide to produce a shorter carboxylic acid. This carboxylic acid in turn is also susceptible to attack by the permanganate at the carbon atom next to the carboxylic group to produce in turn a still shorter carboxylic acid. Thus, successively, the carboxylic groups are lost as carbon dioxide and yield of desired acid is thereby lowered. At the lower temperatures employed in the process of this invention the halogen atoms on the carbon next to the carboxylic group are relatively immune from permanganate oxidation and this effect is minimized or does not take place.

The permanganate salt is ordinarily used in a theoretical amount or in slight excess; the reaction is conveniently carried out by adding the permanganate in small portions to a cooled solution or suspension of the olefins in a reaction flask fitted with a thermometer and any conventional stirring means. In general the permanganate is added until the purple color is no longer discharged. The specific amount of permanganate used will, of course, depend upon the number of double bonds per molecule and the molecular weight of the olefin. In general, for olefins produced by thermal cracking of polytrifluorochloroethylene, the amount of permanganate used will range from about 0.15 to 0.35 part by weight of potassium permanganate per part of olefin. If it is desired to produce perfluorinated or fluoroperhalogenated acids which are olefinic, this may be done by using less than stoichiometric quantities of permanganate where at least a portion of the olefinic starting material contains more than one double bond per molecule.

Any excess permanganate which is present upon completion of the reaction may be destroyed by reaction with a reducing agent such as gaseous sulfur dioxide or aqueous hydrogen peroxide, sodium sulfite, sodium bisulfite or sodium hydrosulfite. The manganese oxide and other insoluble salts are then removed by filtration. The filtrate is then concentrated by removal of the solvent by distillation.

If the liquid medium is anhydrous or substantially anhydrous the oxidation product, instead of being a carboxylic compound, is an acid halide until it is hydrolyzed by the presence of water. When an aqueous reagent is used for the removal of excess permanganate it may serve to hydrolyze the oxidation reaction product as well. If it is desired to recover the acid halide as such, it may be distilled from the reaction mixture, in general, after the unreacted olefin.

In an aqueous medium any unreacted olefin remaining may be removed by dissolving the reaction product in ether, adjusting the pH to 8 or greater by the addition of a base such as sodium hydroxide, followed by extraction of the basic solution with ether. This ether extract will contain any unreacted starting material. The basic mixture containing the acid salts is then acidified with an acid, such as sulfuric acid, and again continuously extracted with a suitable solvent such as ether. Concentration of this ether extract followed by distillation at reduced pressures of the residual oil will yield the product acids. The acids are characterized by conventional means such as determination of neutralization equivalent and the surface tension of the potassium salts.

The free acids of this invention may be converted, if desired, to a metal or ammonium salt by neutralizing a solution of the acid with the corresponding base. Potassium, sodium, ammonium, lithium and calcium salts are particularly useful, the last as a gelling agent in the preparation of greases, and the others as dispersing agents. It is to be noted that the salts of perfluorochloro acids are more compatible with low molecular weight chlorotrifluoroethylene polymer oils than are the salts of perfluoro acids. For example, the calcium salt of a perfluorochloro acid will readily gel a chlorotrifluoroethylene polymer oil, whereas the corresponding calcium salt of a perfluoro acid will not.

Esters of the acids of this invention are also easily obtained by their reaction with an aliphatic or aromatic alcohol under usual esterification conditions. The acids are strong acids and do not require the addition of a mineral acid, such as sulfuric acid, to promote the esterification reaction. Concentrated sulfuric acid may be used, if desired, as a means for removing the water produced as a by-product of esterification, but the preferred method of esterification involves continuous distillation to remove the water and permit the reaction to go to completion.

EXAMPLE 1

Sodium bicarbonate (25 grams), 200 ml. of water, 300 ml. of acetone, and 200 grams of oil boiling at 40–130° C./1.5 mm. and obtained by the thermal cracking of polytrifluorochloroethylene were placed in a reaction flask fitted with a mechanical stirrer and thermometer, and cooled to 5° C. Powdered potassium permanganate (75 grams) was added in small portions during 3½ hours after which the permanganate color was not discharged and heat was no longer liberated. Throughout the addition of the permanganate the temperature was maintained at 5° C., and the pH of the solution maintained at 7 by the addition of aliquots of 25 grams of sodium bicarbonate. The mixture was filtered to remove manganese dioxide, the excess permanganate reduced with an aqueous solution of sodium sulfite, and the mixture filtered again. After removal of the acetone and water by distillation, an oil was obtained which weighed 130 grams.

To the product oil dissolved in ether, a sufficient amount of aqueous sodium hydroxide solution was added to bring the pH of the mixture to pH 11. This basic mixture was continuously extracted with ether. Concentration of this ether extract yielded a residual oil which was found to consist chiefly of unreacted starting material. The ether extracted basic mixture was then acidified to pH 1 by the addition of sulfuric acid and the acid mixture continuously extracted with ether for about 24 hours. After distillation of the ether from this ether extract, a syrup remained which was distilled under reduced pressures to yield fractions 1 and 2, the characteristics of which are given in Table 1. Both cuts were base soluble and acid insoluble.

EXAMPLE 2

Two hundred grams of oil boiling at 130–300° C./1.5 mm. and obtained by the thermal cracking of polychlorotrifluoroethylene was dissolved in acetone (750 ml.), and the solution cooled to —60° C. in a Dry-Ice-carbon tetrachloride-chloroform bath. Powdered potassium permanganate (43 grams) was added in small portions over a period of ½ hour. Stirring was continued for about 10 hours, maintaining the temperature at —60° C. The excess permanganate and manganese dioxide were removed as described in Example I. The pH of the filtrate was adjusted to pH 11, and the acetone removed. Water was then added and the pH checked at pH 11.

After continuous extraction of this basic mixture with ether to remove unreacted starting material, it was acidified with sulfuric acid to pH 1, and continuously extracted with ether for 24 hours. After evaporation of the ether, the ether extract was distilled at reduced pressure to yield the following base soluble product acids (fractions 3 and 4 in Table I). Fresh ether was placed in the extraction pot and the extraction continued for another 24 hours; evaporation of the ether gave an extract which when subjected to distillation at reduced pressure yielded fraction 5 (see table I).

EXAMPLE 3

In a 2 liter 3-necked flask fitted with a stirrer, thermometer and addition funnel were placed 210 grams of thermally cracked polytrifluorochloroethylene with boiling point of 130–300° C./1.5 mm., and 1000 ml. of acetone. After cooling this solution to —65° C., powdered potassium permanganate (31 grams) was added over a period of about 2 hours. When the color persisted and heat was no longer evolved the cooling bath was removed and the mixture allowed to warm up to 15° C., at this point the permanganate color was discharged. The mixture was cooled to —65° C. again and an additional 4 grams of permanganate added. After allowing this mixture to stand at room temperature for about 12 hours, gaseous $SO_2$ was bubbled through for 30 minutes, followed by removal of the coagulated $MnO_2$ by filtration. The acetone was removed from the filtrate and the residue distilled at reduced pressure to yield fraction 6 in Table I.

EXAMPLE 4

The reaction was run in a 5 liter flask and, as described in Example 3, employing acetone (2500 ml.), powdered potassium permanganate (300 grams) and 1000 grams of oil obtained by the thermal cracking of polytrifluorochloroethylene and having a boiling point of 120–290° C./1 mm. The permanganate was added with rapid stirring over a period of 5 hours maintaining the temperature below —60° C. The excess permanganate was reduced with gaseous $SO_2$, the mixture filtered and the $MnO_2$ precipitate washed thoroughly with acetone, keeping the washings separate from the initial filtrate. The filtrate was concentrated and the residual syrup distilled at reduced pressures to yield acidic fractions 7, 8 and 9 (see Table I).

Distillation of the washings yielded fraction 10 (see Table I). During this distillation some solid material sublimed and condensed on the condenser. This solid is referred to as fraction 11 in Table I.

*Table I*

| Fraction | Example | Boiling Point °C./mm. | Yield (grams) | Surface Tension, 1% Solution of K Salt, dynes/cm. | Neutralization Equivalent | Observed Analytical Data | |
|---|---|---|---|---|---|---|---|
| | | | | | | Percent Cl | Percent F |
| 1 | 1 | 85–130/5 | 20.6 | 39.8 | 323.9 | | |
| 2 | 1 | 130–150/5 | 25.5 | 31.3 | 326 | 26.56 | 40.92 |
| 3 | 2 | 160–225/5 | 23.9 | 39.1 | 652 | | |
| 4 | 2 | 225–235/5 | 13.9 | 41.4 | 889 | | |
| 5 | 2 | 150–200/5 | 14.1 | 39.9 | | | |
| 6 | 3 | 128–205/1 | 103 | 40.2 | [1] 1,030 | 31.30 | 43.70 |
| 7 | 4 | 83–134/65.14 | 162 | 48.3 | 451 | 29.72 | 41.01 |
| 8 | 4 | 103–160/1 | 191.5 | 45.8 | 606 | | |
| 9 | 4 | 160–226/1 | 282.5 | 36.0 | 715 | 30.00 | 47.08 |
| 10 | 4 | 100–206/60–1 | 136 | | | | |
| 11 | 4 | Solid which sublimed. | 5 | 46.6 | 246 | | |

[1] After bubbling in $N_2$ to remove HCl and/or HF which formed on standing.

I claim:

1. A method of preparing an aliphatic perhalogenated acid halide containing fluorine which comprises subjecting a perhalogenated aliphatic olefin containing halogen atoms selected from the group consisting of fluorine and chlorine, having at least 7 carbon atoms and being at least half fluorinated to oxidation in the presence of a substantially non-aqueous permanganate solution at a temperature below about 0° C.

2. The method of claim 1 wherein the substantially non-aqueous permanganate solution is an acetone solution.

3. The method of claim 1 wherein the substantially non-aqueous permanganate solution is a pyridine solution.

4. A method for preparing an aliphatic perhalogenated acid halide containing fluorine which comprises subjecting a perhalogenated aliphatic olefin containing halogen atoms selected from the group consisting of fluorine and chlorine, having at least 7 carbon atoms and being at least half fluorinated, to oxidation at a temperature below 10° C. in the presence of a substantially non-aqueous permanganate solution.

5. A method of preparing an aliphatic perhalogenated acid halide containing fluorine which comprises subjecting an aliphatic perhalogenated high polymer containing halogen atoms selected from the group consisting of fluorine and chlorine and at least half fluorinated to thermal cracking conditions to produce lower molecular weight aliphatic olefins having at least 7 carbon atoms, and subjecting said lower molecular weight olefins to oxidation at a temperature not higher than about 0° C. in the presence of a permanganate salt in a substantially non-aqueous solution.

6. The method of claim 5 wherein the permanganate is in an acetone solution.

7. The method of claim 5 wherein the permanganate is in a pyridine solution.

8. A method of preparing an aliphatic perhalogenated carboxylic acid containing fluorine which comprises subjecting a perhalogenated aliphatic olefin containing halogen atoms selected from the group consisting of fluorine and chlorine, having at least 7 carbon atoms and being at least half fluorinated to oxidation at a temperature not higher than about 0° C. in the presence of a permanganate salt in substantially non-aqueous solution to produce an acid halide as the reaction product and thereafter adding water to the reaction product.

9. The method of claim 8 wherein the permanganate solution is an acetone solution.

10. The method of claim 8 wherein the perhalogenated aliphatic olefin is a thermally cracked chlorotrifluoroethylene polymer.

11. The method of claim 8 wherein the perhalogenated aliphatic olefin is a dehydrohalogenated hydrogen-containing polyhalogenated polymer.

References Cited in the file of this patent

UNITED STATES PATENTS

| 2,414,706 | Babcock et al. | Jan. 21, 1947 |
| 2,559,629 | Berry | July 10, 1951 |

OTHER REFERENCES

Haszeldine: Jour. Chem. Soc. (London), pp. 4259–4268 (1952).